United States Patent
Ismail et al.

(10) Patent No.: US 7,610,586 B2
(45) Date of Patent: Oct. 27, 2009

(54) RESOURCE MANAGER FOR CLIENTS IN AN INFORMATION DISTRIBUTION SYSTEM

(75) Inventors: Labeeb K. Ismail, San Francisco, CA (US); Steven R. Thomas, London (CA); Amarendra N. Gogoi, Freemont, CA (US)

(73) Assignee: TVWorks, LLC, Philadelphia, PA (US)

( * ) Notice: Subject to any disclaimer, the term of this patent is extended or adjusted under 35 U.S.C. 154(b) by 259 days.

(21) Appl. No.: 11/118,537

(22) Filed: Apr. 29, 2005

(65) Prior Publication Data

US 2005/0246707 A1    Nov. 3, 2005

Related U.S. Application Data

(60) Provisional application No. 60/566,837, filed on Apr. 30, 2004.

(51) Int. Cl.
*G06F 9/46* (2006.01)
*G06F 15/173* (2006.01)
*H04N 7/173* (2006.01)
*H04N 7/16* (2006.01)

(52) U.S. Cl. ............... 718/104; 718/103; 709/226; 725/131; 725/139

(58) Field of Classification Search ......... 718/100–104; 709/201–203, 226, 223; 725/25, 131, 139
See application file for complete search history.

(56) References Cited

U.S. PATENT DOCUMENTS

| | | | |
|---|---|---|---|
| 5,579,055 A | 11/1996 | Hamilton et al. | |
| 5,808,694 A | 9/1998 | Usui et al. | |
| 5,838,968 A * | 11/1998 | Culbert | 718/104 |
| 6,075,570 A | 6/2000 | Usui et al. | |
| 6,430,570 B1 * | 8/2002 | Judge et al. | 707/103 R |
| 6,539,374 B2 | 3/2003 | Jung | |
| 6,665,869 B1 * | 12/2003 | Ellis et al. | 725/39 |
| 6,745,245 B1 * | 6/2004 | Carpenter | 709/229 |
| 7,028,298 B1 * | 4/2006 | Foote | 718/104 |
| 7,058,964 B2 * | 6/2006 | Khandelwal et al. | 725/25 |
| 7,137,119 B1 * | 11/2006 | Sankaranarayan et al. | 718/103 |
| 2002/0088008 A1 | 7/2002 | Markel | |
| 2002/0100059 A1 * | 7/2002 | Buehl et al. | 725/116 |
| 2002/0199200 A1 * | 12/2002 | Addington | 725/97 |
| 2003/0009769 A1 * | 1/2003 | Hensgen et al. | 725/131 |
| 2003/0041104 A1 | 2/2003 | Wingard et al. | |
| 2003/0088876 A1 | 5/2003 | Mao et al. | |
| 2003/0101213 A1 * | 5/2003 | Wright | 709/203 |
| 2004/0107451 A1 * | 6/2004 | Khandelwal et al. | 725/146 |
| 2004/0218905 A1 * | 11/2004 | Green et al. | 386/83 |
| 2004/0268407 A1 * | 12/2004 | Sparrell et al. | 725/116 |
| 2005/0050577 A1 * | 3/2005 | Westbrook et al. | 725/134 |
| 2007/0094666 A1 * | 4/2007 | Ode | 718/104 |

OTHER PUBLICATIONS

U.S. Appl. No. 10/834,753, filed Apr. 29, 2004.
U.S. Appl. No. 11/038,298, filed Jan. 19, 2005.
U.S. Appl. No. 11/103,297, filed Apr. 11, 2005.

* cited by examiner

*Primary Examiner*—Meng-Ai An
*Assistant Examiner*—Jennifer N To
(74) *Attorney, Agent, or Firm*—Banner & Witcoff, Ltd.

(57) ABSTRACT

A method for processing a resource allocation request associated with an application running at a set top box, by identifying all resources required to complete the resource allocation request and acquiring all the identified resources if the resources are available.

15 Claims, 6 Drawing Sheets

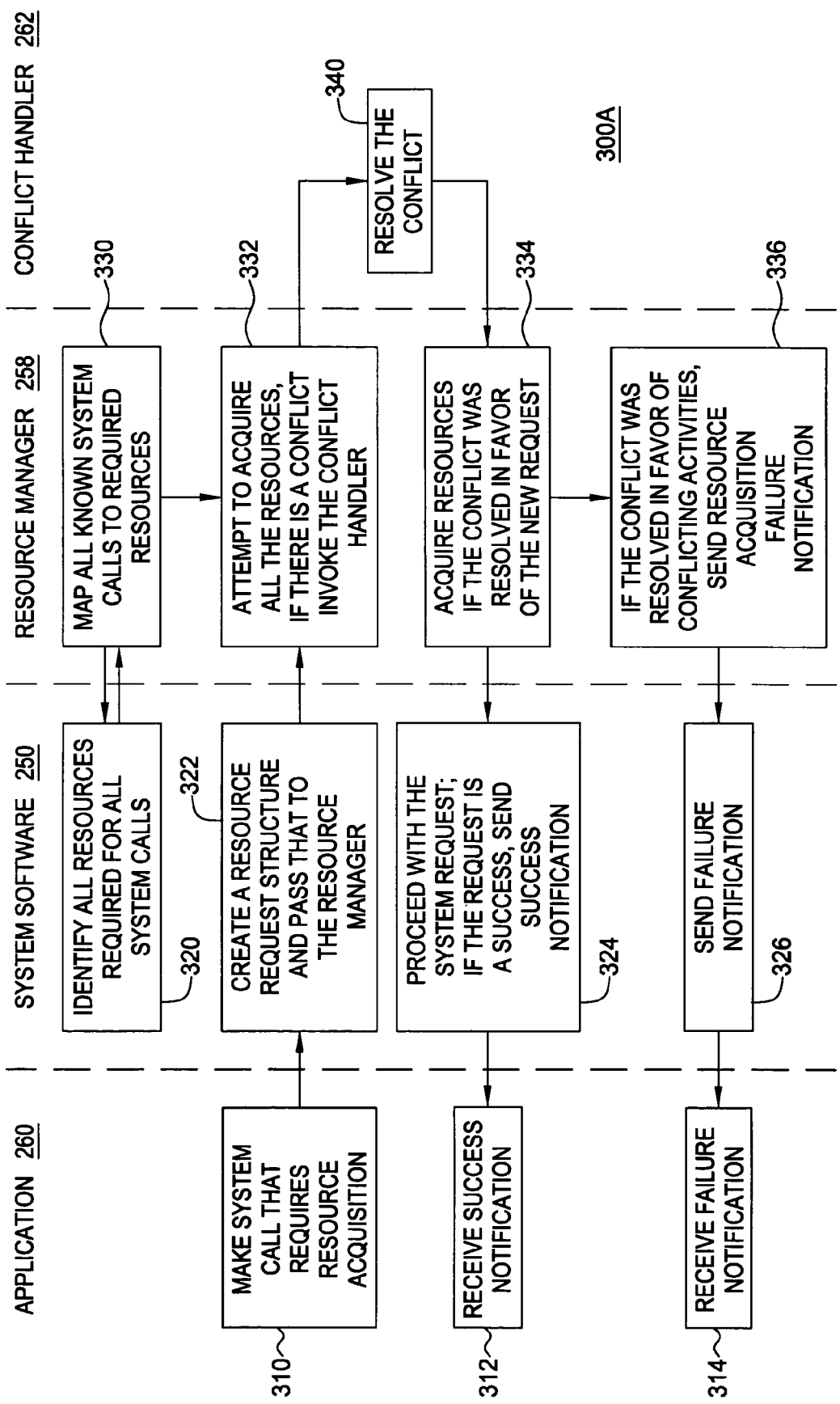

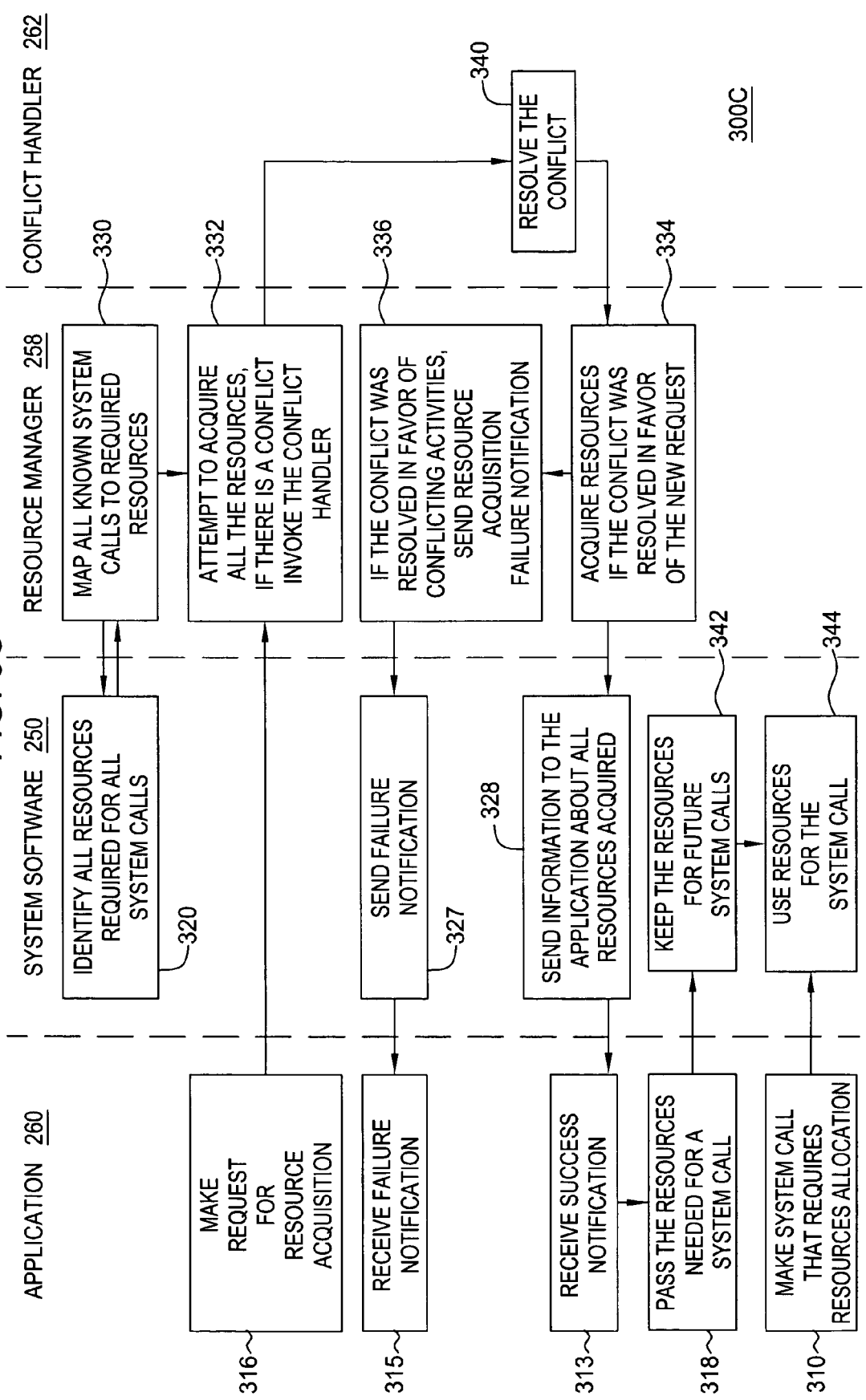

400

RESOURCE MANAGER FOR CLIENTS IN AN INFORMATION DISTRIBUTION SYSTEM

CROSS-REFERENCE TO RELATED APPLICATIONS

This application claims benefit of U.S. provisional patent application Ser. No. 60/566,837, filed Apr. 30, 2004, which is herein incorporated by reference in its entirety.

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

1. Field of the Invention

The present invention relates to data processing systems and, more particularly, to resource management within a client device such as a set top box.

2. Description of the Related Art

In the current generation of set top boxes (STBs), when multiple resources are needed to perform a single activity, these resources are allocated separately by application or system software. If the system detects conflicts during these allocations, each conflict is presented individually to the user or to conflict handler software. When multiple resources are required for a single activity this may cause more than one conflict to be presented to the user or conflict handler software. However, when more than one conflict is presented to the user, this may cause confusion to the user. Additionally, the conflict handler may resolve one conflict in favor of the new activity and another conflict against the new activity. In this case, the new activity cannot proceed since it requires all the conflicts it generated to be resolved in its favor, but some existing activities may already have been terminated.

SUMMARY OF THE INVENTION

Various deficiencies of the prior art are addressed by the present invention, one embodiment of which is a method which comprises receiving a resource allocation request associated with an application running at a set top box, identifying all resources required to complete the resource allocation request, and acquiring all the identified resources if the resources are available. If there is a conflict between the received resource allocation request and a contending resource allocation request, the method determines which resource allocation request is to be satisfied. In one embodiment, the determining step is performed according to at least one of a user input, a priority ranking of activities, and a priority ranking of applications. The requested resources comprise at least one of a video resource, an audio resource, and a tuner resource. In one embodiment, the application comprises at least one of a personal video recorder (PVR) application and an electronic program guide (EPG) application.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A depicts a flow diagram of an embodiment of a method according to the present invention;

FIG. 3C depicts a flow diagram of another embodiment of the method illustrated in FIGS. 3A and 3B.

DETAILED DESCRIPTION

The present invention will be generally described within the context of an information distribution system that propagates content (e.g., movies, sports, television programming and the like), services (e.g., video on demand, Interactive Program Guide (IPG) services and the like) and applications (e.g., billing and other services) to clients or set top boxes associated with users. It will be appreciated by those skilled in the art that while the invention has specific utility within the context of the systems described herein, the invention has broad applicability to any system supporting client devices of varying capability.

Figure 1:
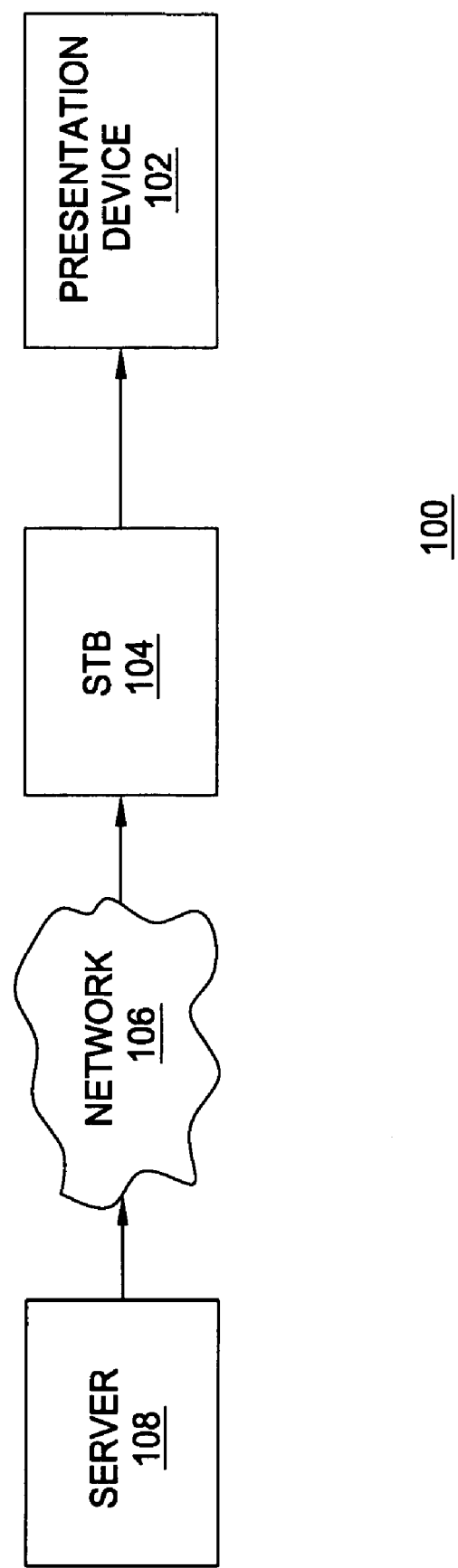
FIG. 1 depicts a high-level block diagram of an information distribution system suitable for use with the present invention.

FIG. 1 depicts a high-level block diagram of an information distribution system suitable for use with the present invention. A client computer or set top box (STB) 104 is connected to a presentation device 102 such as a television or other audiovisual display device or component(s). The connection between STB 104 and presentation device 102 allows STB 104 to tune and/or provide a presentation signal (e.g., a television signal) to presentation device 102. The presentation device may be connected to the STB 104 through a home network. The output of the STB 104 may be further processed by the presentation device before presentation. The functions of the presentation device may be distributed across multiple devices.

STB 104 is also connected to a communication system 106. In one embodiment, communication system 106 includes a telephone network and the Internet. In other embodiments, communication system 106 includes a network, the Internet without a telephone network, a dedicated communication system, a cable or satellite network, a single connection to another client computer or STB, or any other means for communicating with another electronic entity. The communication system 106 is also connected to a server 108, such as a Unix or Windows server computer or a broadcast head-end.

System 100 may be logically segmented into a server function and a client function. The various functions may be implemented as a method by one or more processors. The functions may be embodied as software instructions within a signal bearing medium or a computer product. Within the context of a peer to peer network, the server functions and client functions may both be implemented on client and/or server devices.

Figure 2:
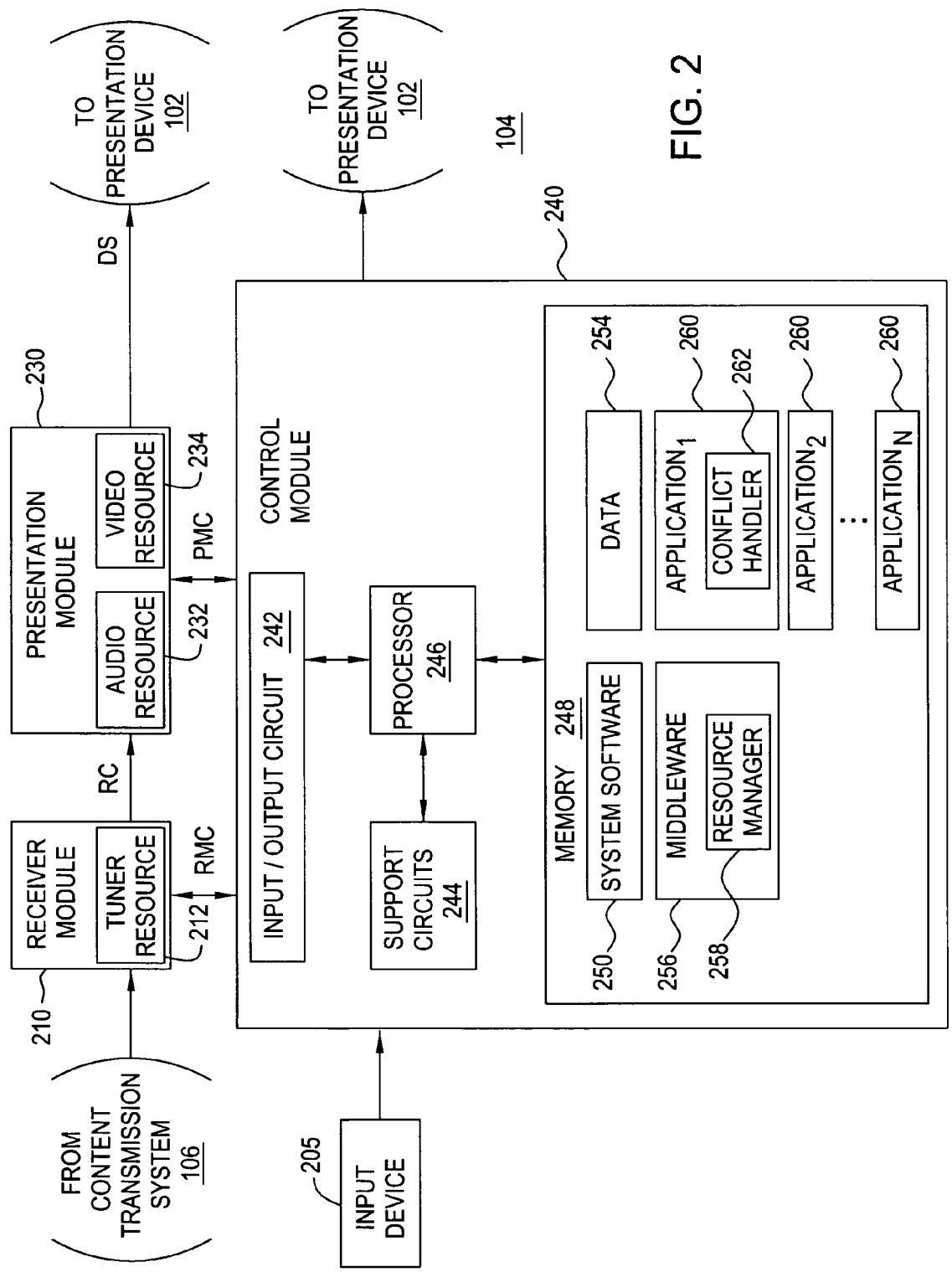
FIG. 2 depicts a high-level block diagram of a set top box (STB) suitable for use in the information distribution system of FIG. 1.

FIG. 2 depicts a high level block diagram of a STB 104 suitable for use in the information distribution system 100 of FIG. 1. The STB 104 of FIG. 2 comprises an input device 205, a receiver module 210, a presentation module 230, and a control module 240.

The receiver module 210 receives television programs, applications and other content from a content transmission system such as the network 106 discussed above with respect to FIG. 1. The receiver module 210 includes all of the circuitry necessary to implement at least one of analog television reception, digital television reception, and data reception. The receiver module 210 is controlled by the control module 240 via a receiver module control signal RMC. The receiver module 210 and control module 240 communicate with each other to effect desired content selections, channel selections and the like. The receiver module 210 provides selected received content to RC the presentation module 230. The received content RC provided to the presentation module 230 may comprise compressed content, decompressed content, data and the like.

The receiver module comprises at least one tuner resource 212. The tuner resource 212 may comprise, for example, a tuner which is capable of being controlled, via the RMC, to tune the receiver module to a specific signal received from the communication system 106. In one embodiment, the receiver module comprises a plurality of tuner resources 212.

The presentation module 230 processes the received content RC provided by the receiver module 210 to produce a display signal DS suitable for use by the presentation device 102, such as a television monitor, computer display device and the like. For example, in the case of the receiver module 210 providing a compressed digital video stream (and associated audio streams), the presentation module 230 includes appropriate decompression/decoder circuitry along with presentation circuitry such that a correctly formatted display stream DS is provided to the display device. The display stream DS may comprise a National Television Standards Committee (NTSC) analog display signal, a digital display signal or any other signal format as desired, depending upon the type of display device utilized. The presentation module 230 is controlled by the control module 240 via a presentation module control signal PMC. The presentation module 230 and control module 240 communicate with each other to effect desired decompression and deencryption processing, format processing, image processing and other functions associated with processing the received content RC to produce the display signal DS.

The presentation module comprises at least one audio resource 232 and at least one video resource 234. The audio resource 232 may comprise, for example, a means to control which audio stream of a plurality of possible audio streams are incorporated into the DS. The audio resource 232 may receive input from the control module via the PMC. The video resource 234 may comprises, for example, a means to control which video stream of a plurality of possible video streams are incorporated into the DS. The video resource 234 may receive input from the control module via the PMC.

The STB 140 may also include a storage module (not shown) which comprises at least one mass storage device for storing received content RC provided by the receiver module 210. The storage module may comprise a single mass storage device, a plurality of mass storage devices, an array of mass storage devices, and the like. The storage module is controlled by the control module 240 via a storage module control signal. The storage module and control module 240 communicate with each other to effect desired logical and physical partitioning of the one or more mass storage devices, selection of compression/decompression formats and other operating details associated with the storage and retrieval of content from the mass storage device(s). In one embodiment, the storage module can be used, in conjunction with the other components of STB 104, to provide a personal video recorder (PVR). The control module 240 comprises a processor 246 as well as memory 248 for storing system software 250 (e.g. an operating system, drivers, and the like), data 254, middleware 256, and at least one application 260. The processor 246 cooperates with conventional support circuitry 244 such as power supplies, clock circuits, cache memory and the like, as well as circuits that assist in executing the software routines stored in the memory 248. As such, it is contemplated that some of the steps discussed herein as software processes may be implemented within hardware, for example as circuitry that cooperates with the processor 246 to perform various steps. The control module 240 also contains input/output (I/O) circuitry 242 that forms an interface between the various functional elements communicating with the control module 240.

In one embodiment, there may be a plurality of applications 260 (e.g. application$_1$, application$_2$, and so on up to application$_N$). Generally speaking, the middleware 256 is a software environment running within a software environment provided by the system software 250 and which is capable of supporting the application 260. In one embodiment, the middleware 256 may integrally comprise a resource manager 258. However, in another embodiment, the resource manager 258 may exist separate from the middleware 256, for example the resource manager 258 may be an application 260. In one embodiment, at least one of the applications 260 may comprise a conflict handler 262. In another embodiment, the conflict handler 262 may be a separate entity unto itself, such as a separate application 260.

Although the control module 240 is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

The control module 240 may be operably coupled to a number of devices or systems. For example, the I/O circuitry 242 in FIG. 2 is depicted as interfacing to the input device 205 (e.g., a keyboard, mouse, remote control and the like), a network (e.g., communication system 106), a display device (e.g., presentation device 102), the receiver module 210, and the presentation module 230.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

The resource manager 258 is a software module that allows different applications 260 to share STB resources such as, for example, the tuner resource 212, the audio resource 232 and the video resource 234. The resource manager 258 allows applications 260 to reserve resources required to perform activities such as channel tune, record, playback, and the like. The resource manager 258 responds to a resource allocation request to reserve a set of resources for an activity. The resource allocation request may be received by the resource manager 258 from an application 260 or from the system software 250.

In one embodiment, the resource request may be an activity-specific resource request that is an aggregate request for all resources required to do an activity. For example, the resource request may request all resources for an activity such as tuning the STB 104, which in one embodiment such a resource request may comprise a request for the tuner resource 212, the audio resource 232, and the video resource 234. The resource manager 260 attempts to reserve all of the resources required for the specified activity. By simultaneously allocating all of the resources required for an activity, the resource manager 258 avoids resource conflicts for a single activity staggered over time. Also, by allocating resources according to an activity, a priority level may be assigned differently to different activities undertake by the application 260, rather than assigning all activities undertaken by the application 260 the same priority.

In one embodiment, the resource request may also be a request for a particular resource (e.g. the tuner resource 212). The resource request may also be a combination of resource-specific and activity-specific requests. For example, an application 260 may request all resources required for a particular activity in addition to requesting a particular resource. A particular resource may be identified by a resource identifier (ID).

The resource manager 258 determines which of the requested resources are available. If one or more of the requested resources are in use by some other application 260 which will not relinquish the resource, the resource manager 258 determines that there is a conflict between applications 260 for the resource. The resource manager 258 may first attempt to resolve the conflict using a set of conflict resolution rules of the resource manager 258. For example the resource manager 258 may query the application 260 to determine if it will relinquish the requested resource. If the resource manager 258 is unable to resolve the conflict using its set of conflict resolution rules, the resource manager 258 may then invoke a conflict hander 262 to resolve the conflict, if such a conflict handler 262 exists. The conflict handler 262 will attempt to resolve the conflict using a set of conflict resolution rules of the conflict handler 262.

The conflict resolution rules of the resource manager 258 and the conflict handler 262 may be based, for example, on at least one of priority values associated with activities, priority values associated with applications 260, and input from a user. For example, the conflict resolution rules may determine that a lower priority activity is to be terminated to free up resources for a higher priority activity. The conflict resolution rules may assign each application 260 with a base priority value and a maximum priority value. Each activity initiated by the application 260 has a priority value within the range of priority values assigned to that application 260 (i.e. between the base priority value of the application 260 and the maximum priority value of the application 260).

The resource manager 258 optionally allows a high priority application 260 to register its own conflict handler 262 to resolve conflicts. For example, the resource manager 258 may allow an application 260 having a priority value above a predetermined value to register its own conflict handler 262. If a conflict handler 262 is registered for a high priority application 262, in one embodiment all unresolved conflicts involving any application 260 running at the STB 104 are sent to that conflict handler 262. Such a conflict handler 262 registered by a high priority application 260 has its own set of conflict resolution rules.

In one embodiment, the system software 250 uses the resource manager 258 to acquire the necessary resources to complete a system call or system activity undertaken by an application 260.

FIG. 3A depicts a flow diagram of an exemplary method 300A according to this embodiment, showing interactions between the various software modules running at the STB 104. Specifically, the flow diagram of FIG. 3A is segmented according to the functions of four functional elements; namely, application function 260, system software function 250, resource manager function 258, and conflict handler function 262. While specific steps with the method 300A of FIG. 3A are depicted as being associated with specific functional elements, it will be appreciated by those skilled in the art that alternate allocations of functions between the various functional elements may be provided.

At step 310, an application 260 makes a system call that requires resources to be acquired. At step 322, the system software 250 generates a resource allocation request, which comprises a resource request structure that contains information about all the resource required by the system call, and propagates the resource request to the resource manager. The resource request structure comprises at least one of a data structure and software object. The resource request structure optionally contains information about the system activity for which the resources are required.

At step 330, upon startup of the resource manager 258, the resource manager 258 builds a table which maps all possible system calls to their required resources. This mapping step uses the system software 250, at step 320, to identify all resources required for all possible system calls and activities.

At step 332, using the resource allocation request and the map of system calls to required resources, the resource manager 258 attempts to acquire all of the resources needed for the activity. If some resource needed for the activity cannot be acquired because that resource is in use by another application 260, the resource manager 258 will attempt to free up that resource based on its conflict handling process and rules. For example, the resource manager 258 may request that the other application 260 release the resource. An alternate technique for providing this conflict handling process is defined by DAVIC 1.4.1 Specification Part 9 Annex F, which is herein incorporated by reference in its entirety.

If the conflict cannot be resolved using the conflict handling process and rules of the resource manager 258, the resource manager 258 invokes a conflict handler 262, if such a conflict handler 262 exists, at step 340 to resolve the conflict.

If a conflict handler 262 is not registered, then the resource manager 258 uses internal conflict resolution rules to resolve the conflict. One example of such a rule is to use the priority value for the application 260 that made the system request to resolve the conflict. For example, if the requesting application 260 has higher priority than the application 260 that currently holds the resources needed for the request, the conflicting activities are terminated and the resources they hold are released. The resource manager 258 then acquires those resources for the new system request.

If the conflict handler 262 is invoked, the conflict handler 262 attempts to provide a resolution to the conflict at step 340. If the conflict handler 262 resolves the conflict in favor of the new request, the resource manager 258 acquires the requested resources for the requesting application 260 at step 334. In one example, the resource manager 258 terminates the conflicting requests to free up required resources, acquires the required resources; and sends a notification to the system software 250 that the resources are acquired.

At step 324, the system software 250 then completes the system request using the acquired resources. At step 312, the application 260 receives notification from the system software 250 that the system call requiring resource acquisition was successful.

If the conflict manager 262 resolves the conflict against the new resource request, the resource manager 258 sends a failure notification to the system software 250 at step 336 indicating acquisition failure. On receiving the failure notification from the resource manager 258, the system software 250 sends a failure notification to the application 260 at step 326 indicating failure of the system call. The application 260 receives the failure notification at step 314. In one embodiment, the system software 250 may also attempt to proceed with the system call without using the resources.

In another embodiment, the application 260 acquires resources before performing a system call or activity that requires resources.

Figure 3B:
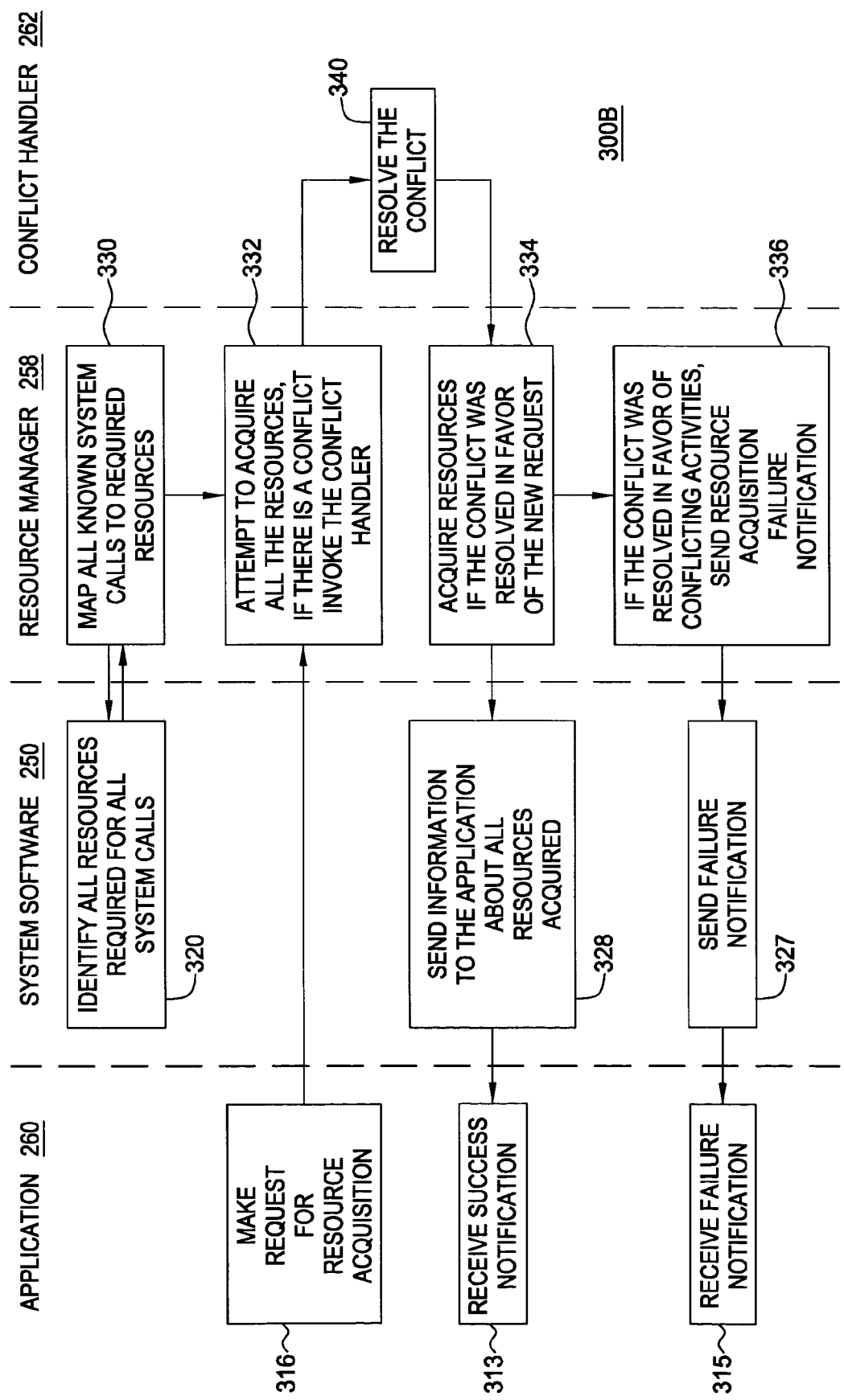
FIG. 3B depicts a flow diagram of another embodiment of the method illustrated in FIG. 3A.

FIG. 3B depicts a flow diagram of an exemplary method 300B according to this embodiment, showing interactions between the various software modules running at the STB 104. The flow diagram of FIG. 3B is segmented according to the functions of four functional elements; namely, application function 260, system software function 250, resource manager function 258, and conflict handler function 262. While specific steps with the method 300B of FIG. 3B are depicted as being associated with specific functional elements, it will be appreciated by those skilled in the art that alternate allocations of functions between the various functional elements may be provided.

The differences between the embodiment depicted by FIG. 3B and the embodiment depicted by FIG. 3A include that at step 316 the application 260 generates a resource allocation request and propagates the request directly to the resource manager 258 to acquire resources. At step 328 the system software 250 receives information about the acquired resources from the resource manager 258 and sends this information, as well as a notification of the success of the resource acquisition, to the application 260. At step 313 the application 260 receives the notification of the success of the resource acquisition, as well as the information about the acquired resources.

At step 327, if the resource acquisition failed, the system software 250 sends a failure notification to the application 260 indicating that the resource acquisition failed. At step 315 the application 260 receives the failure notification.

In another embodiment, the application 260 acquires resources required for a system call or activity and control of the acquired resources is passed to the system software 250.

FIG. 3C depicts a flow diagram of an exemplary method 300C according to this embodiment, showing interactions between the various software modules running at the STB 104. The flow diagram of FIG. 3C is segmented according to the functions of four functional elements; namely, application function 260, system software function 250, resource manager function 258, and conflict handler function 262. While specific steps with the method 300C of FIG. 3C are depicted as being associated with specific functional elements, it will be appreciated by those skilled in the art that alternate allocations of functions between the various functional elements may be provided.

The differences between the embodiment depicted by FIG. 3C and the embodiment depicted by FIG. 3B include that at step 318 the application 260 passes control of the acquired resources to the system software 250. At step 342, the system software 250 maintains control of the acquired resources for possible future system calls or activities by the application 260. For example, in this embodiment, the application 260 may at step 310 make a system call that requires resource allocation. At step 344, the system software 250 uses the resources which it maintained control of in step 342 to complete the system call.

In other embodiments, the resources may either be acquired by the application 260, acquired by the system software 250, passed from the application 260 to the system software 250, passed from the system software 250 to the application 260, and/or combinations thereof.

In one embodiment, a resource request by the application 260 or the system software 250 is a request for exclusive access to the set of specified resources. Exclusive access to a resource excludes other activities (e.g. requests for acquisition by an application 260 or system software 250) from accessing the resource. If an application 260 requests access to a resource being exclusively accessed by another application 260, a conflict will be generated. In another embodiment, a resource request by the application 260 or the system software 250 is a request for non-exclusive access to the set of specified resources. Non-exclusive access to a resource does not exclude other activities from non-exclusively accessing the resource. In one embodiment, non-exclusive access is equivalent to read-only file access permission. An application 260 non-exclusively accessing the resource is not permitted to perform an activity that changes the state of the resource.

Figure 4:
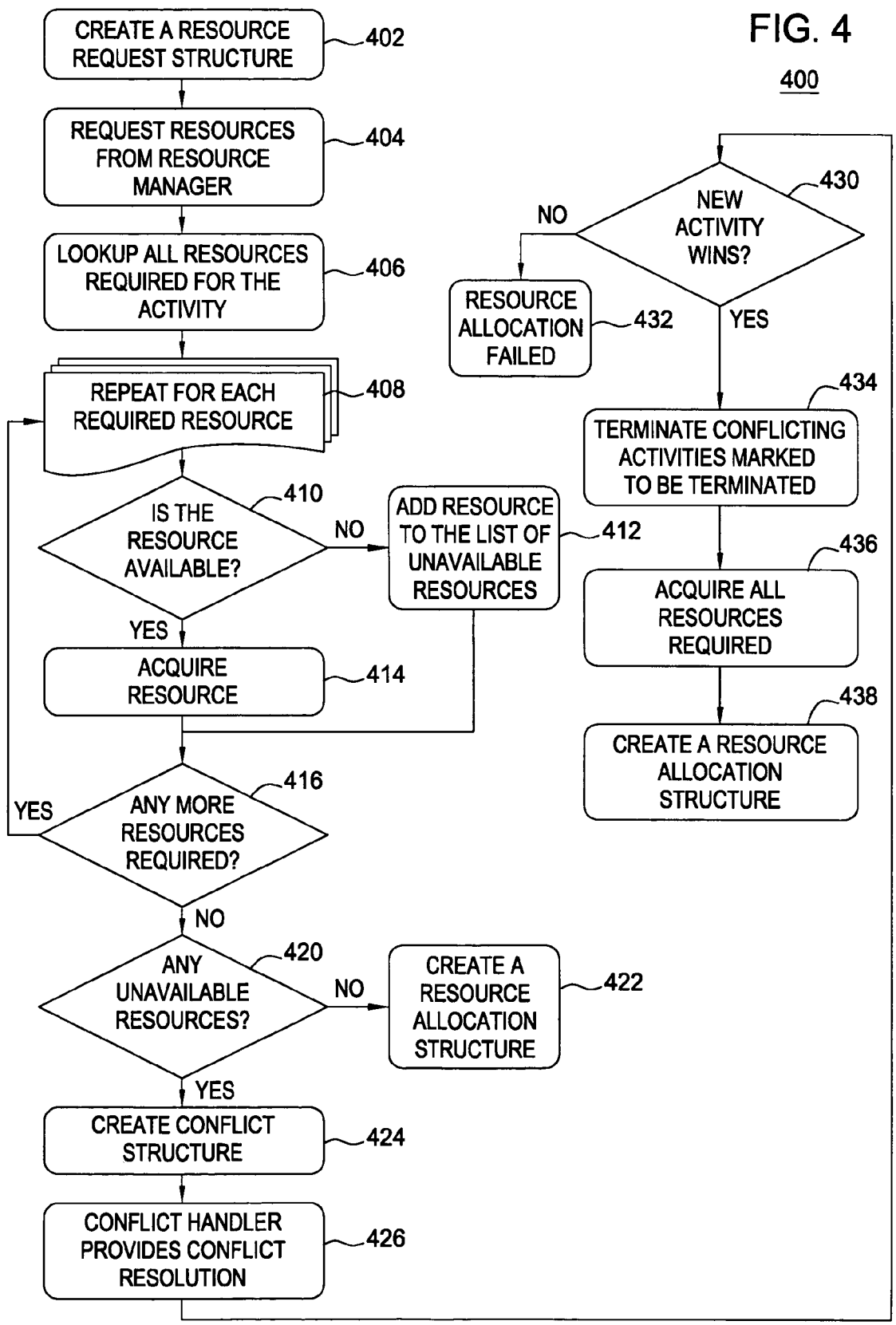
FIG. 4 depicts a flow diagram of an embodiment of a method according to the present invention.

FIG. 4 depicts a flow diagram of an embodiment of a method for resource allocation. At step 402, an application 260 creates a resource allocation request comprising a resource request structure corresponding to the resources required for one or more activities or system calls.

At step 404, the resources are requested from the resource manager 258 by passing the resource request structure to the resource manager 258. At step 406, the resource manager 258 determines which resources are required for the activity. All or part of the resources required may be explicitly specified by the resource request structure. The resource manager 258 may determine, for example from the map created in steps 320 and 330, resources that need to be acquired for the activity but which are not explicitly contained in the resource request structure.

At step 408, the resource manager 258 initiates a set of steps (i.e. 408-416) which are repeated for each resource required to complete the resource request. At step 410, the resource manager 258 checks to see if an instance of the specified resource is available. If the resource is available, at step 414 the resource manager 258 acquires the resource. If the resource is not available, at step 412 the resource manager 258 adds the resource to a list of the requested resources which are unavailable. At step 416, the resource manager 258 checks to see if more resources are required by the resource request, and if more resources are required, returns to step 408.

If all the resources have been checked for availability, and either acquired if available or added to the list of unavailable resources if not, the method proceeds to step 420, at which the resource manager 258 determines if there were any unavailable resources. If there were not unavailable resources, the resource manager 258 creates a resource allocation structure at step 422. The resource allocation structure comprises at least one of a data structure and software object. The resource allocation structure is then passed to the application 260.

If the list of unavailable resources is not empty, the resource manager 258 creates a conflict structure at step 424.

The conflict structure comprises at least one of a data structure and a software object. The resource manager 258 creates the conflict structure before invoking the conflict handler 262. The conflict structure comprises information about the resource request, the resources required for the resource request, all conflicts relating to resource acquisitions, information about activities (e.g. activities of at least one of the application and the system software) using the resources involved in conflicts, and information about application and system software which initiated the activities resulting in conflicts.

In one embodiment, the resource manager 258 attempts to handle the conflict using internal conflict handling policies and rules such as the DAVIC resource negotiating process. If one or more resources cannot be acquired using such conflict handling policies, the resource manager 258 invokes the conflict handler 262, if such a conflict handler 262 has been registered with the resource manager 258, and the conflict handler 262 attempts to resolves the conflict at step 426. If a conflict handler 262 has not been registered with the resource manager 258, or if the conflict handler 262 is unable to resolve the conflict, the resource manager 258 may resolve the conflict based on internal conflict resolution rules.

The conflict handler 262 resolves the conflict based on conflict resolution rules of the conflict handler 262. The conflict resolution rules of the conflict handler 262 may be based on at least one of the priority value of the requesting application 260, the type and priority value of the activity associated with the request or conflict, and other information related to activities or resources. The conflict handler 262 may also resolve the conflict according to input received from a user. The conflict handler 262 may present to the user (e.g. via the display device) visible screens which present the conflict to the user and which are capable of receiving input (e.g. via the input device) from the user regarding how to resolve the conflict.

The conflict handler 262 returns information to the resource manager 258 regarding how to resolve the conflict. In one embodiment, the conflict handler 262 passes this information to the resource manager 258 in the form of a prioritized array of activities. The prioritized array indicates that resources are to be used for activities having a high priority (e.g. at the top of the prioritized array), whereas activities having a low priority (e.g. at the bottom of the prioritized array) may be terminated or cancelled if sufficient resources are not available.

For example, at step 430, the resource manager 258 determines if the conflict has been resolved in favor or the new activity represented by the resource request. If the conflict handler 262 resolves the conflict against the resource request, the resource manager 258 returns that the resource allocation has failed at step 432.

If the conflict has been resolved in favor of the resource request, for example if the conflict handler 262 places the activity corresponding to the new resource request ahead of other existing activities in the prioritized array, the activities below the new request may be terminated by the resource manager 258 at step 434 to free up resources for the new request.

At step 436, the resource manager 258 acquires all remaining resources required by the request if the conflict is resolved in favor of the request. At step 438 the resource manager 258 creates a resource allocation structure, which comprises at least one of a data structure and a software object, corresponding to the resources allocated for the new resource request. This resource allocation structure is maintained by the resource manager 258 until the resources are released, and is used for future conflict resolution.

The resource manager 258 returns the resource allocation structure as a response to resource request to notify successful resource allocation. In one embodiment, the resource manager returns the resource allocation structure to the application 260 via the system software 250.

Table 1 shows an exemplary Java API, the ResourceContentionHandler API, which may be used by the resource manager 258 to create the conflict structure and invoke the conflict handler 262. The ResourceContentionHandler API is an entry point into the conflict handler interface. For example, in a typical implementation, the ResourceContentionHandler API may be part of a conflict handler 262 which is implemented as part of an application such as, e.g. an Electronic Programming Guide (EPG). In one embodiment, the API prompts the user requesting input regarding conflicts. In one embodiment, failure of the user to provide input may cause the conflict handler 262 to apply some default rules. A failure by the conflict handler 262 to resolve the conflict returns a NULL object.

TABLE 1

Exemplary ResourceContentionHandler API

```
package xxx.yyy.resource;
/**
* <P>
* A class implementing this interface decides which application shall be
* allowed to reserve a resource.
* </P> <P>
* An application which has a MonitorApplicationPermission
("handler.resource")
* may have a class implementing this interface, and may set an instance of
* it in the ResourceContentionManager.
* The {@link ResourceContentionHandler#resolveResourceContention}
method
* decides how to resolve resource conflicts between the new request and
* existing resource allocations.
* See the ResourceContentionManager for the details.
* </P>
*/
public interface ResourceContentionHandler
{
    /**
    * This method notifies the ResourceContentionHandler that one too
    many
    * resource contentions have occurred between two or more
    applications.
    * Each entry in the currentReservations indicates a set of resources
    * reserved by an application for a single activity such as a resource
    usage
    * by a single service context. There could be multiple
    * entries in this list from a single application. An entry may
    * correspond to a current resource usage or resource reservations for a
    future activity.
    * A prioritized array of {@link ResourceUsage} instances is returned.
    * The array is in priority order from highest to lowest indicating the
    * priority order to be followed by the implementation while resolving
    the
    * conflicts. The resource management part of the OCAP
    * implementation shall call this method when it determines that multiple
    * resources are involved in a contention where all contentions must be
    * notified to the contention handler simultaneously. When this method
    * returns the implementation will iterate each entry in the array in
    * priority order, awarding resources as required by the activity repre-
    sented
    * by the resourceUsage. All resources required for an activity may not
    be
    * represented by the getResources method of the ResourceUsage. The
    * ResourceContentionHandler may use other information such as
    Application
    * priority to prioritize the array of ResourceUsages returned.
    * </p>
    * The resource contention handler may evaluate the input parameters
    and
```

TABLE 1-continued

Exemplary ResourceContentionHandler API

```
 * return them unchanged.
 * </p>
 *
 * @param newRequest The resource usage object containing the
 * attributes of the resource[s] request.
 *
 * @param currentReservations The resource usage objects currently
 * owned by applications which are in conflict with the requester.
 *
 * @return A prioritized array of resource usage objects. The first entry has
 * the highest priority. This function returns null if the contention
 handler wants
 * the implementation to resolve the conflict.
 */
 public ResourceUsage [ ] resolveResourceContention(
 ResourceUsage newRequest,
 ResourceUsage [ ] currentReservations);
}
```

Table 2 shows an exemplary Java API, the ResourceUsage API, which encapsulates the resources in question. In one embodiment, it is a requirement that all managed/scarce resources in the system implement the DAVIC org.davic.resources.ResourceProxy interface.

TABLE 2

Exemplary ResourceUsage API

```
/**
 * This interface represents a grouping of resources specific to a function
 * performed by an application.
 */
public interface ResourceUsage
{
/**
 * Gets the {@link AppID} of the application associated with the set
 * of resources contained in the usage.
 *
 * @return AppID of the appliation.
 */
public AppID getAppID( );
/**
 * Gets the {@link ResourceProxy} array associated with the
 application via
 * the usage. If the resource usage represents a future reservation,
 the resources
 * returned may be null.
 *
 * @return The array of qualified java class names for the resources
 used (or
 * required) for this resource usage.
 */
public java.lang.String [ ] getResources( );
}
```

Table 3 shows an exemplary Java API, the ResourceRequest API, which is an exemplary class which may be used by at least one of the system software 250 and the application 260 to create the resource request structure to request resources from the resource manager 258. The resource request structure may contain information passed by the requester (e.g. the application or the system software) that may be used to create a conflict descriptor that may be shown to the user while presenting the conflict to the user. For example, the FIELD_USER_DATA in the API shown in Table 3 may contain a text string "Recording Friends on Channel 2" that could describe the activity to the user.

TABLE 3

Exemplary ResourceRequest API

```
package xxx.yyy.resources;
/**
 * A <code>ResourceRequest</code> is populated with parameters specific
 * to a particular resource activity. An instance of this class
 * is then passed to the <code>ResourceManager</code>.
 */
public class ResourceRequest {
/**
 * Invalid resource Id.
 */
public static final char RESOURCE_ID_INVALID = (char)−1;
/**
 * Tuner resource Id. Implementing class:
 */
public static final char RESOURCE_ID_TUNER = 0x00;
/**
 * Video plane (major/minor) resource Id. Implementing class:
 */
public static final char RESOURCE_ID_VIDEO_PLANE = 0x01;
/**
 * Exclusive graphics activity. A resource allocation will contain a
 * resource proxy with the Id {@link #RESOURCE_ID_GRAPHICS}.
 */
public static final int ACTIVITY_GRAPHICS_SET_STATE =
ACTIVITY_RESOURCE_BASE_ID+21;
/**
 * Exclusive tuner activity. A resource allocation will contain resource
 * proxies with the following Ids:
 * <ul>
 * <li>{@link #RESOURCE_ID_TUNER}</li>
 * <li>{@link #RESOURCE_ID_AUDIO}</li>
 * <li>{@link #RESOURCE_ID_VIDEO_PLANE}</li>
 * </ul>
 * <p>
 *
 * <b>Note:</b> the main tuner and primary video plane are included.
 */
public static final int ACTIVITY_TUNER_SET_CHANNEL =
ACTIVITY_RESOURCE_BASE_ID+42;
==================================================
 * AGGREGATE ACTIVITIES - may return more than one resource
 *
==================================================*/
/**
 * Exclusive activity. A resource allocation will contain resource
 * proxies with the following Ids:
 * <ul>
 * <li>{@link #RESOURCE_ID_AUDIO}
 * <li>{@link #RESOURCE_ID_VIDEO_PLANE}
 * </ul>
 *
 */
public static final int ACTIVITY_PVR_ASSET_PLAY =
ACTIVITY_RESOURCE_BASE_ID+1001;
/**
 * Field for identifying exclusivity of the request.
 */
public static final int FIELD_EXCLUSIVE_ACCESS = 1;
/**
 * Field for identifying the user data associated with this request.
 */
public static final int FIELD_USER_DATA = 2;
/**
 * Indicates the maximum number of resources that will be allocated for
 * any one request. This number is inclusive of resources allocated for a
 * given activity plus those resources identified by resource Id.
 */
private static final int MAX_RESOURCES_PER_ALLOCACTION = 4;
/*
==================================================
 * Instance variables
==================================================*/
*
/**
 * A constructor that requests resources for a particular activity. TV
 * and window (if required) must be set separately. The default
 * exclusivity mode is true.
```

TABLE 3-continued

Exemplary ResourceRequest API

```
*
* @param activityCode the activity to attempt to perform.
* @param requestor a <code>ResourceClient</code> requiring access to a
* shared resource or resources.
* @param handler the listener that will receive a resource response.
*
*/
public ResourceRequest( int activityCode, ResourceClient requestor,
ResourceStatusListener handler);
/**
* Adds a specific resource to the resource request through
* a resource identifier.
*
* @param resourceId the resource associated with this Id.
* @throws IllegalArgumentException if <code>resourceId</code> is
invalid.
* @since TV Navigator 5.0
*/
public void requestResource( int resourceId ) throws
IllegalArgumentException;
/**
* Adds a specific resource to the resource request through
* a resource identifier and a 0-based resource index.
* For example, a user can request the second tuner on the device
* by invoking this method. The total number of resources obtained
* by this method is dependent on the number of resources allocated
* for a particular activity.
* <BR>
* For example, if an activity allocates one resource by default, then we
* can request <code>MAX_RESOURCES_PER_ALLOCACTION−1
</code> resources with
* this method. If {@link #ACTIVITY_NONE} is used as a parameter to
* this object's constructor, then at most
* <code>MAX_RESOURCES_PER_ALLOCACTION</code>
can be requested
* with this API.
*
* @param resourceId the resource associated with this Id.
* @param resourceIndex an index into the set of resources.
* @throws IllegalArgumentException if <code>resourceId</code> is
invalid.
*/
public void requestResource( int resourceId, int resourceIndex )
throws IllegalArgumentException;
/**
* Sets fields.
*
* @param fieldId the field to set.
* @param value the value to set.
* @throws IllegalArgumentException if the <code>fieldId</code> is
invalid.
*/
public void setField( int fieldId, Object value )
    throws IllegalArgumentException
{
    switch(fieldId)
    {
        case FIELD_EXCLUSIVE_ACCESS:
            exclusiveAccess = ((Boolean)value).booleanValue( );
            break;
        case FIELD_USER_DATA:
            userData = (RequestDetail)value;
            break;
        default:
            break;
    }
}
} // end: ResourceRequest
```

Table 4 shows an exemplary Java API, the ResourceAllocation API, which is an exemplary class that represents the resource allocation structure.

TABLE 4

Exemplary ResourceAllocation API

```
package xxx.yyy.resources;
/**
* Defines a <code>ResourceAllocation</code> object. This object is
created in
* response to a request to the {@link ResourceManager} to allocate
system
* resources for a particular activity. This object may be returned
synchronously or
* delivered asynchronously via a listener interface.
*/
public class ResourceAllocation
{
    /**
    * Gets a <code>ResourceProxy</code> at entry. Valid indices are in the
    range
    * <code>0</code> to {@link #getResourceCount}<code>−1</code>.
    *
    * @param entry the resource index.
    * @return ResourceProxy for the specified index.
    * @throws IndexOutOfBoundsException if the index is out of bounds.
    */
    public ResourceProxy getProxy( int entry ) throws
    IndexOutOfBoundsException;
    /**
    * Gets the activity Id that spawned this <code>ResourceAllocation
    </code>.
    * Activity ID will not be valid if the request was an explicit request by
    resource ID.
    *
    * @return the activity Id that spawned this
    * <code>ResourceAllocation</code>.
    */
    public int getActivityId( );
    /**
    * Gets the number of resources allocated by the request. This API is
    particularly
    * useful for an activity-based request as the number of required resources
    is not
    * known ahead of time.
    *
    * @return the number of resources.
    */
    public int getResourceCount( );
    /**
    * Gets the resource Id at <code>entry</code>. This will return one of
    * the <code>RESOURCE_ID</code> constants defined in {@link
    ResourceEvent}.
    * This value can be used in a switch to cast the {@link ResourceProxy}
    object
    * to a specific type.
    *
    * @param entry a valid index into the resource list.
    * @return the resource type at the specified index.
    * @throws IndexOutOfBoundsException if the specified index is out of
    bounds.
    */
    public int getResourceId( int entry) throws IndexOutOfBoundsException;
    /**
    * Gets the resource index at entry 'I'. This API returns the 'mode' of the
    device at
    * the given index. 'Mode' is defined as tuner index, or video plane ID,
    etc.
    *
    * @param entry a valid index into the resource list.
    * @return the resource index at entry.
    * @throws IndexOutOfBoundsException if the specified index is out
    of bounds.
    */
    public int getResourceIndex( int entry) throws
    IndexOutOfBoundsException;
    /**
    * This API is similar to the method that returns a resource proxy by index.
    *
    * @param resourceId a resource ID constant defined in a ResourceRequest
    * @return the <code>ResourceProxy</code> that matches
    * <code>resourceId</code>.
    * @throws IllegalArgumentException for an invalid <code>resourceId
```

TABLE 4-continued

Exemplary ResourceAllocation API

```
</code>.
*/
    public ResourceProxy getProxyById( int resourceId ) throws
IllegalArgumentException;
} // end: ResourceAllocation
```

While the foregoing is directed to embodiments of the present invention, other and further embodiments of the invention may be devised without departing from the basic scope thereof, and the scope thereof is determined by the claims that follow.

The invention claimed is:

1. A method, comprising:
receiving a resource allocation request associated with an application that will use the resource, the application running at a set top box;
identifying all resources required to complete the resource allocation request;
if there is a conflict between the received resource allocation request and a contending resource allocation request associated with a second application, determining which resource allocation request is to be satisfied; and
if the received resource allocation request is to be satisfied, acquiring all the identified resources,
wherein the determining step comprises invoking a conflict handler that is part of the application running at the set top box, and wherein the requested resources comprises at least one of a video resource, an audio resource, and a tuner resource.

2. The method of claim 1, wherein the determining step is performed according to at least one of a user input, a priority ranking of activities, and a priority ranking of applications.

3. The method of claim 1, wherein the conflict handler uses a set of conflict resolution rules.

4. The method of claim 1, wherein the application comprises at least one of a personal video recorder (PVR) application and an electronic program guide (EPG) application.

5. The method of claim 1, comprising:
receiving a system call that requires resource acquisition; and
generating a resource allocation request for the resource requiring acquisition.

6. The method of claim 1, wherein the resource allocation request includes a resource request structure which comprises at least one of a data structure and a software object.

7. A method, comprising:
determining whether a resource allocation request associated with a requesting application conflicts with at least one of existing and proposed resource allocations associated with at least one other application, the resource allocation request comprising a request for all of the resources needed by the requesting application, the applications running at a set top box; and
if a conflict exists, resolving the conflict in favor of at least one of the resource allocation request, existing resource allocation, and proposed resource allocation;
wherein the resolving step comprises invoking a conflict handler that is part of the requesting application or the other application, and wherein the requested resources comprises at least one of a video resource, an audio resource, and a tuner resource.

8. The method of claim 7, wherein the resolving step comprises allocating all of the requested resources to the requesting application if the conflict is resolved in favor of the resource allocation request.

9. The method of claim 7, wherein the resolving step is performed according to at least one of a user input, a priority ranking of activities, and a priority ranking of applications.

10. The method of claim 7, wherein the application comprises at least one of a personal video recorder (PVR) application and an electronic program guide (EPG) application.

11. A method performed by an application programming interface (API) within a middleware environment of a client device, the method comprising:
receiving a resource allocation request associated with a first application that will use the resource, the application running at a set top box;
identifying all resources required to complete the resource allocation request;
if there is a conflict between the received resource allocation request and a contending resource allocation request associated with a second application, determining which resource allocation request is to be satisfied; and
if the received resource allocation request is to be satisfied, acquiring all the identified resources,
wherein the determining step comprises invoking a conflict handler that is part of one of the first application and the second application, and wherein the requested resources comprises at least one of a video resource, an audio resource, and a tuner resource.

12. A memory having stored thereon instructions that, when executed, perform:
receiving a resource allocation request associated with an application that will use the resource, the application running at a set top box;
identifying all resources required to complete the resource allocation request;
if there is a conflict between the received resource allocation request and a contending resource allocation request associated with a second application, determining which resource allocation request is to be satisfied; and
if the received resource allocation request is to be satisfied, acquiring all the identified resources,
wherein the determining step comprises invoking a conflict handler that is part of the application running at the set top box, and wherein the requested resources comprises at least one of a video resource, an audio resource, and a tuner resource.

13. The memory of claim 12, wherein the determining step is performed according to at least one of a user input, a priority ranking of activities, and a priority ranking of applications.

14. An apparatus comprising:
a processor; and
memory storing instructions that, when executed by the processor, perform:
receiving a resource allocation request associated with an application that will use the resource, the application running at a set top box;
identifying all resources required to complete the resource allocation request;
if there is a conflict between the received resource allocation request and a contending resource allocation request associated with a second application, determining which resource allocation request is to be satisfied; and if the received resource allocation request is to be satisfied, acquiring all the identified resources, wherein the determining step comprises invoking a conflict handler that is part of the application running at the set top box, and wherein the requested resources comprises at least one of a video resource, an audio resource, and a tuner resource.

15. The apparatus of claim 14, wherein the determining step is performed according to at least one of a user input, a priority ranking of activities, and a priority ranking of applications.

* * * * *

UNITED STATES PATENT AND TRADEMARK OFFICE
CERTIFICATE OF CORRECTION

PATENT NO. : 7,610,586 B2 Page 1 of 1
APPLICATION NO. : 11/118537
DATED : October 27, 2009
INVENTOR(S) : Ismail et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 341 days.

Signed and Sealed this

Twelfth Day of October, 2010

David J. Kappos
*Director of the United States Patent and Trademark Office*